United States Patent

[11] 3,534,714

| [72] | Inventor | Alfred Urlaub<br>Nuernberg, Germany |
|---|---|---|
| [21] | Appl. No. | 760,625 |
| [22] | Filed | Sept. 18, 1968 |
| [45] | Patented | Oct. 20, 1970 |
| [73] | Assignee | Maschinenfabrik Augsburg Nuernberg<br>Aktiengesellschaft<br>Nuernberg, Germany |
| [32] | Priority | Sept. 22, 1967 |
| [33] | | Germany |
| [31] | | No. 1,576,020 |

[54] SPARK IGNITION FOR INTERNAL COMBUSTION ENGINE
8 Claims, 5 Drawing Figs.

[52] U.S. Cl. ............................................... 123/32,
123/143, 123/169
[51] Int. Cl. ............................................... F02b 17/00
[50] Field of Search ............................................... 123/32,
32(SPA), 143, 169(E), 169(E3), 143(A)

[56] References Cited
UNITED STATES PATENTS

| 1,401,231 | 12/1921 | Anderson | 123/143 |
| 2,457,652 | 12/1948 | Fisher | 123/32 |
| 2,914,044 | 11/1959 | Liebel | 123/32 |
| 2,995,121 | 8/1961 | Meurer | 123/32 |
| 3,107,658 | 10/1963 | Meurer | 123/32 |
| 3,244,159 | 4/1966 | Meurer | 123/32 |
| 3,349,760 | 10/1967 | Horan | 123/169(el.) |
| 3,420,216 | 1/1969 | Meurer et al. | 123/32 |

*Primary Examiner*—Laurence M. Goodridge
*Attorneys*—Francis D. Stephens and Hugo Huettig,Jr.

ABSTRACT: A high compression internal combustion engine has a combustion chamber in the piston. The fuel in the chamber is ignited by an anode electrode rod which extends into the chamber, while the wall of the chamber forms the cathode. Good ignition occurs over the entire engine operating range.

Patented Oct. 20, 1970    3,534,714

INVENTOR

Alfred Urlaub

INVENTOR
Alfred Urlaub

SPARK IGNITION FOR INTERNAL COMBUSTION ENGINE

This invention relates to an internal combustion engine having high compression and spark ignition. The piston has a combustion chamber in the shape of a body of rotation or the combustion chamber is in the cylinder head. At least one jet of liquid fuel is spread on the wall of the combustion chamber from which an air swirl vaporizes the fuel which becomes mixed with the air and is then burned.

In this type of an internal combustion engine with fuel injection and air-fuel mixture, in view of the large excess of air especially present during partial engine load, it has been sought to produce an air-fuel mixture adjacent the actual ignition source which has such a composition that it is sure to be ignited to begin the combustion of the fuel.

In this connection, an ignition system for an internal combustion engine having a combustion chamber in the piston has been made in which a jacketed spark plug at the upper dead center of the piston extends through a recess in the wall of the combustion chamber, which recess is open toward the bottom of the combustion chamber. In this recess, an air-fuel mixture formed largely by the vaporization of fuel particles is concentrated on the bottom of the recess with the aid of guide grooves in the wall of the combustion chamber and is ignited. However, this initial ignition has several disadvantages.

The recess is a rupture in the wall of the combustion chamber so that the smooth air swirl important for the formation of the air-fuel mixture is disturbed. Further, the fuel portion which reaches the recess and which exceeds the amount required for starting ignition can no longer satisfactorily participate in the thermal formation process of fuel-air mixing. This causes a deterioration in the combustion process and thus of the capacity. This is especially true in small cylinder units because the recess which has dimensions fixed by the size of the spark plug is very large relative to the size of the combustion chamber. Also it is very difficult, despite the guide grooves in the wall of the combustion chamber, to achieve in the lower capacity range at the point in the spark plug jacket exactly fixed by the path of the sparks, a mixture which is in the ignition limit. This is especially true when the spark plug is located, by reason of the intake and exhaust valves, diametrically opposite the fuel injection nozzle since the introduction of fuel into the spark plug jacket becomes much more difficult due to its long path from the fuel nozzle under the influence of the intensive air swirl.

Attempts have been made to form the recess in the combustion chamber wall as a hole in the piston connected by one or two bores with the combustion chamber. This does reduce the turbulence of the air swirl and safely conducts the injected fuel into the path of ignition sparks coming from the bore. However, again it cannot be avoided that the portion of the fuel which reaches the bore and which is in excess during full capacity as exceeding the amount needed for the start of ignition is prevented from satisfactorily participating in the process of the thermal formation of air-fuel mixing.

It must be also further considered that the ignition voltage necessary for the spark ionization path and spark arc-over in a fuel-air mixture is very heavily dependent on the mixture combustion and increases as the mixture grows leaner. Since it is not possible to achieve under all engine load conditions a uniform air-fuel mixture which enhances the spark arc-over in the path of the sparks, it has been found that the ionization voltages have increasingly higher values as the amount of injected fuel is reduced which puts a correspondingly high requirement and stress on the entire ignition system.

It is the object of this invention to prevent the aforesaid disadvantages and to produce in a simple way an ignition system which absolutely guarantees ignition in the entire engine operation range, such as engine starting, idling, and so forth, up to full engine load.

In general, these objects are obtained by producing an internal combustion engine in which an electrode rod for ignition purposes extends as close as possible adjacent the wall of the combustion chamber and toward the bottom of the combustion chamber while the combustion chamber wall itself forms the other electrode. This makes possible another feature of the invention in that a ridge is formed in the wall of the combustion chamber adjacent the electrode rod which causes a slight increase in the amount of fuel in the wall area adjacent the rod and further secures the guarantee of ignition.

In this manner, the almost impossible to realize requirement is eliminated by bringing under all engine load conditions an air-fuel mixture capable of ignition to the position fixed by the spark path. Ignition occurs at a point where an air-fuel mixture capable of ignition can be guaranteed even when the amount of injected fuel is very small.

This has always been the case above the fuel film on the combustion chamber wall.

Experience has shown that the ionization voltage is very dependent upon the combustion of the air-fuel mixture. Since in this invention the spark has the possibility of arcing-over at various points from the electrode rod to the combustion chamber wall, such preferably takes place where the air-fuel mixture capable of ignition has the lowest ionization voltage value. Thus, to a certain extent, it can be said that it is not the mixture that is brought to the spark, but the spark occurs to the most ignitable air-fuel mixture. It is sufficient that fuel film portions are present almost at any place of the possible spark arc-over which is always guaranteed by the corresponding arrangement of the fuel jet point of contact and electrode position.

Following initial ignition, the burning of the next portion of the fuel mixture which has in the meanwhile been prepared by vaporization of the fuel film proceeds, in this case, under the influence of the air swirl and also through the fact that the burning starts directly on the surface of the fuel film and proceeds more orderly than in the case where the spark ignited flame has shot out of the spark plug jacket into the combustion chamber.

The time point for the spark arc-over can be selected after the first fuel particles reach the electrode in such a way that optimum conditions result for the further combustion process, capacity, smooth engine running, etc. All of this is not possible to this extent in a engine construction in which an ignitable fuel mixture has to be brought to an accurately fixed place. Experience has shown that the time period for ignition at that place is restricted to very narrow limits to the moment in which the ignitable fuel mixture is close to the electrode. This creates great difficulties, especially in an engine using mixed fuels and such fuels which during the time they are injected into an ignition chamber, subsequently vaporized, and then transferred to the spark path, are in the meantime ready for self-ignition. In this invention, however, these periods needed for fuel transport are shorter and furthermore the vaporization of the fuel necessary for the formation of the air-fuel mixture can be also supported at the ignition point itself by means of a very hot spark head.

Since the igniting spark is found under all load conditions at the surface of the fuel film, a mixture composition which is very favorable for ionization, ignition voltage, as experience has shown, remains practically independent of the engine load and thus substantially smaller which benefits the entire system. A spark electrode rod extending freely into the combustion chamber is intensively cooled by the flow of fresh intake air which is also known from experience with glow plugs, but in this invention in the opposite sense. Consequently, the possibility of glow plug ignition which could occur in the case where the electrodes are protected against the air flow is eliminated. The formation of a bridge between two fixed electrodes, as in a conventional spark plug, and which could lead to ignition failure is here practically impossible.

The advantage of not being restricted to one single local spot in the combustion chamber for starting ignition can also be found in known systems in which a glow plug is used instead of a spark plug. Such an ignition system, however, has the following disadvantages.

The ignition of the fuel mixture requires relatively high temperatures of at least 1000°C. in the electrically heated glow plug. Such high temperatures must be present under all load conditions which causes correspondingly large stresses in the glow plug material and, on the other hand, requires a very expensive control of the electric current supplied to the glow plug and which depends upon the particular operating condition of the engine. Also, the electric energy requirement is much larger than is needed for spark ignition. Finally, the point of time for ignition is intimately coupled with the point of injection time. The very important heretofore mentioned possibility for starting ignition which is optimumly timed with respect to the formation of the fuel film also does not exist.

In another feature of this invention, the wall area of the combustion chamber used as the other electrode is lined with a material resistant to corrosion by being burned by the ignition sparks. However, it is not that the spark will occur at different points on the electrode rod because the places with the smallest ionizing voltage will change with operation conditions as, for example, with the formation of fuel film close to the electrode, and therefore the burning waste is not localized to dot-like areas but is spread over a more extended surface and thus proceeds with regard to time substantially slower than with a conventional spark plug. Furthermore, in this invention, the polarity of the conventional spark plug used in an Otto-motor is reversed, for example, the electrode rod in this invention becomes the anode. Since corrosion usually takes place primarily on the anode side, the center electrodes of conventional spark plugs have a negative polarity in order to thereby produce a certain equalization for the center electrodes which has a higher thermal load. In this invention, it is preferred to have the corrosion occur in the spark electrode rod which can be easily replaced.

When, because of construction reasons, the distance from the electrode rod to the center of the cylinder has to be somewhat larger than with a centrally arranged combustion chamber, in this invention the combustion chamber can be off-centered in the piston in that the combustion chamber is displaced in a parallel plane along the connecting line between the electrode rod and the fuel injection nozzle. This makes it possible to prevent any corrections of the contour of the combustion chamber wall close to the electrode. Another feature of this invention is in that the combustion chamber can be displaced at a right angle to the connecting line between the fuel injection nozzle and the electrode rod. This arrangement, especially when mixed fuel is used, has the advantage that it brings the point of contact with the fuel jet with the chamber wall closer to the area or zone of the electrode rod without undesirably increasing the manner of the fuel portion distributed in the air because the fuel jet is slightly more directed away from the wall. However, circumstances can occur where it would be appropriate to offset the combustion chamber in both ways at the same time.

The electrode rod is preferably installed parallel to the longitudinal axis of the cylinder. Slight inclinations, as from 8 to 10° which may be due to overall construction, are permissible as long as the distance between the electrode rod and the combustion chamber wall is confined to small limits by the piston movements in the area at ignition times. Larger deviations can only be equalized in this invention that the electrode has a conical shape where the face or figure end of the electrode rod is nearest the bottom of the combustion chamber.

Finally, in this invention, the most favorable conditions for ignition are obtained when the electrode rod extends at lease into one-fourth of the depth of the combustion chamber.

So far, a single electrode rod has been described. Also, it has been stated that a spark occuring directly on the surface of the fuel film is best for guaranteeing ignition within the entire working load of the engine.

Also, by using an elongated electrode rod, the spark tends to occur always at the point where the ionization voltage is lowest because of the fuel-air mixture at that point.

Consequently, in this invention, an engine can be provided with two electrode rods which are as close as possible to the combustion chamber wall and extend toward the bottom of the chamber. In this case, one of the electrodes occupies a space provided in the wall of the chamber.

The means by which the objects of this invention are obtained are described more fully with reference to the accompanying drawings, in which.

Figure 1:
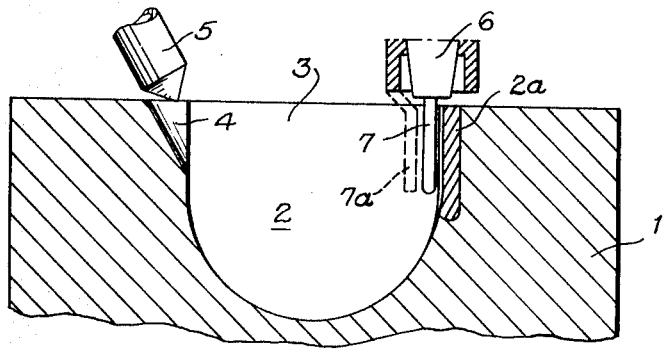
FIG. 1 is a cross-sectional view through a piston head having a combustion chamber centrally arranged therein.
Figure 2:
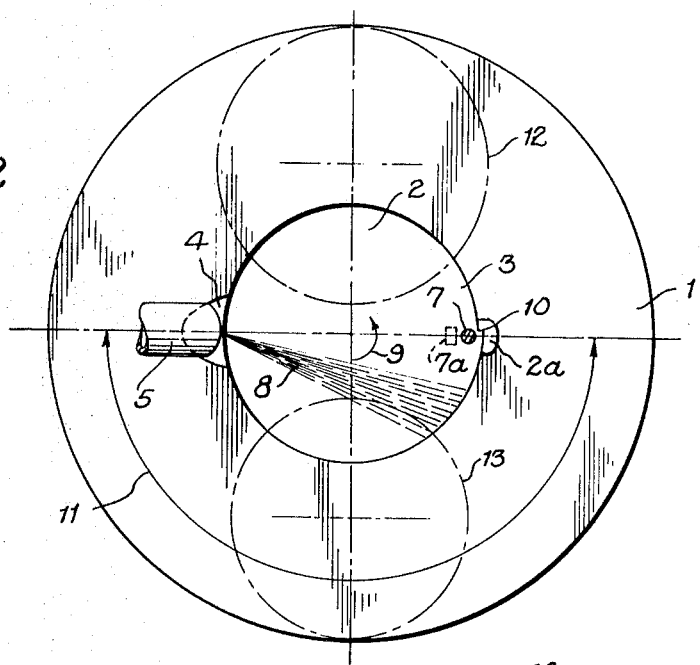
FIG. 2 is a plan view of FIG. 1.

As shown in FIG. 1, the piston head 1 has a centrally positioned combustion chamber 2 in the shape of a body of rotation and having a top opening 3. In the edge of opening 3 is a slot 4 into which the inclined fuel injection nozzle enters as the piston reaches its up dead center. The spark ignition device 6 which is threaded into the cylinder head, not shown, has its elongated electrode rod mounted diametrically from nozzle 5. The electrode 7 is illustrated in FIG. 2 as having a circular cross section. The electrode 7 extends into chamber 2 at least one-fourth the depth of the chamber and lies close to the chamber wall. The wall of chamber 2 preferably is recessed, with the recess containing a lining 2a composed of a material resistant to spark corrosion. Also, as shown in FIGS. 1 and 2, a second electrode 7a can be mounted parallel to electrode rod 7. When electrode rod 7a is used, lining 2a can be omitted. In such case, the rod 7a constitutes the mass of material which would otherwise be used for the formation of the recess containing lining 2a. Both electrode rods are positioned directly in the air swirl in the chamber 2.

As shown in FIG. 2, one or more fuel jets 8 from nozzle 5 are spread to a great extent or completely on the combustion chamber wall where the fuel because of its kinetic energy and the intensive air swirl indicated by arrow 9 around the longitudinal axis of the combustion chamber spreads as a fuel film on the combustion chamber wall and reaches to the portions of the wall lying opposite nozzle 5 at electrode 7 where it is ignited by a spark. A small spoiler ridge 10 is formed in the wall of the combustion chamber which slightly enriches the fuel on the wall close to the rod 7 and thus forms additional insurance for the guarantee of fuel ignition.

In FIG. 2, it has been assumed that the distance of the arc 11 from nozzle 5 to rod 7 is 180°. This or even a somewhat smaller angle is assumed with regard to engine construction if, as indicated in FIG. 2, a single intake valve 12 and a single exhaust valve 13 are used. If smaller angles are possible, as always seen in the direction of air rotation, because of other valve arrangements, then they can be used.

Figure 3:
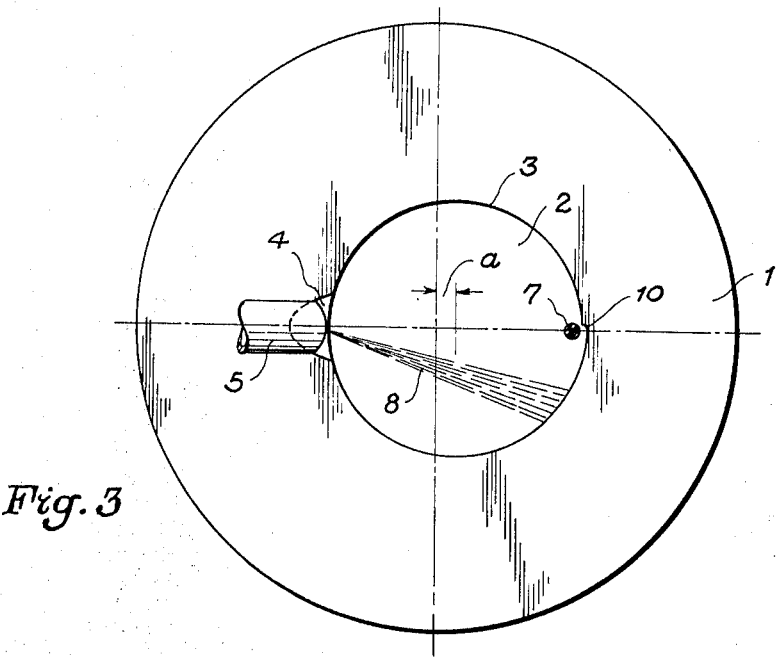
FIGS. 3 and 4 are plan views similar to FIG. 2 but showing the combustion chamber offset in the piston head.

As shown in FIG. 3, the combustion chamber 2 is offset a distance $a$ from the line connecting nozzle 5 and rod 7, if, for structural reasons, the distance from rod 7 to the center of the cylinder has to be somewhat larger rather than the combustion chamber being centered as in FIG. 1. By so doing, changes in the chamber wall contour adjacent the electrode which otherwise may be required can be avoided.

Figure 4:
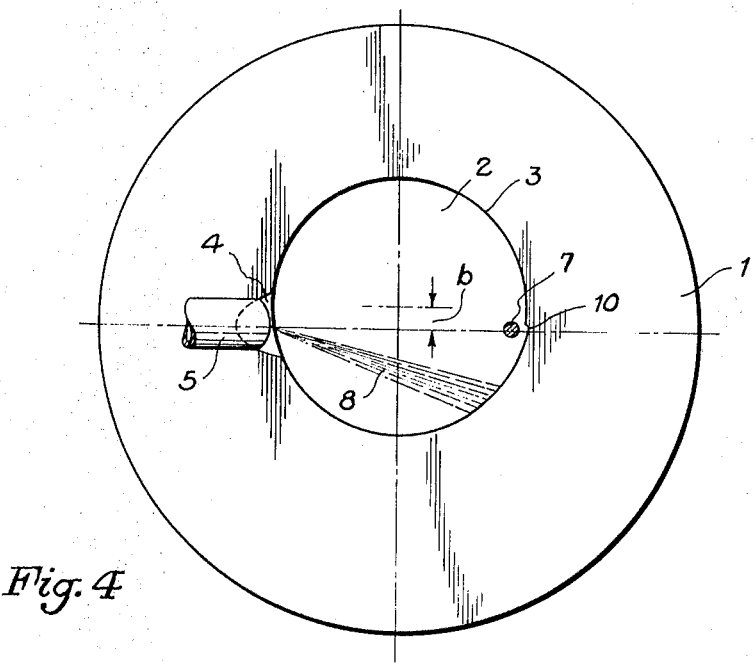

In FIG. 4, the combustion chamber is offset a distance $b$ at right angles to the connecting line between the nozzle 5 and rod 7. This form has especial advantage for an engine using various fuels or mixed fuels. It is possible in this case to bring the point of contact of the fuel jet on the chamber wall closer to the wall area adjacent the rod 7 without undesirably increasing in any manner and at the same time the fuel portion distributed in the air by a jet which is directed somewhat away from the chamber wall. If need be, both the offsets of FIGS. 3 and 4 can be used at the same time.

Figure 5:
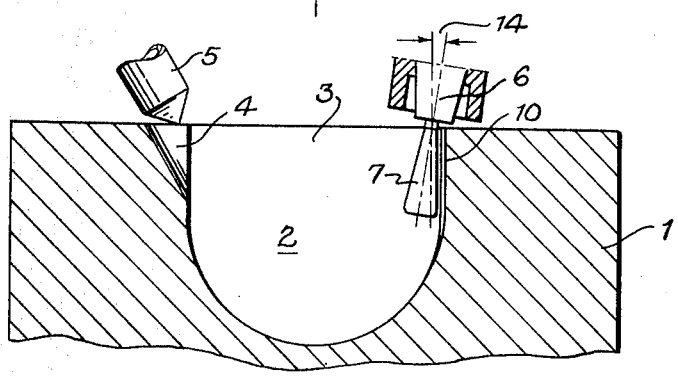
FIG. 5 is a cross-sectional view similar to FIG. 1 showing a conically shaped electrode rod.

Preferably, the electrode is mounted parallel to the longitudinal axis of the cylinder. As shown in FIG. 5, the electrode rod 7 can be slightly inclined by an angle 14 as long as the distance between the rod 7 and chamber wall is only slightly changed because of the movement of the piston during ignition time. Somewhat larger deviations can be compensated for if need be by giving the electrode rod a conical shape as shown in FIG. 5.

I claim:

1. An air compression fuel injection internal combustion engine comprising a cylinder having a longitudinal axis, a piston in said cylinder, a cylinder head, a combustion chamber in the form of a body of rotation associated with said piston and cylinder head, fuel injection nozzle means offset from said longitudinal axis for injecting the major portion of liquid fuel as a film on the wall of said combustion chamber for being vaporized therefrom by an intensive air swirl in said chamber, and at least one spark electrode rod extending into said chamber close to the wall of said chamber and to at least one-fourth of the depth of said chamber for forming an ignition spark between said electrode and the chamber wall at a point where the air-fuel mixture has the lowest ionization voltage value.

2. An engine as in claim 1, in which said rod is the anode and said wall is the cathode.

3. An engine as in claim 2, further comprising an electric spark resistant lining on said wall adjacent said rod.

4. An engine as in claim 2 in which said combustion chamber is off-centered from a line between said nozzle means by a parallel displacement distance ($b$).

5. An engine as in claim 2 in which said rod is of uniform cross section and has a longitudinal axis extending parallel to said wall.

6. An engine as in claim 2 in which said rod has a conical shape with the conical base directed toward the bottom of said chamber, and said rod having a longitudinal rod axis inclined to the longitudinal axis of said cylinder.

7. An engine as in claim 1, further comprising a second spark electrode extending into said chamber close to said wall.

8. An engine as in claim 1, further comprising a ridge in said wall extending parallel and close to said rod.